United States Patent Office

2,782,095
Patented Feb. 19, 1957

2,782,095

SODIUM NITRATE OF REDUCED TENDENCY TO CAKING AND SETTING

Jack Ames, Ardrossan, Scotland, assignor to Imperial Chemical Industries Limited, a corporation of Great Britain No Drawing. Application May 28, 1954,
Serial No. 433,265

Claims priority, application Great Britain August 19, 1953

10 Claims. (Cl. 23—102)

The present invention is concerned with improvements in or relating to sodium nitrate and is particularly concerned with providing sodium nitrate having a greatly reduced tendency towards caking and setting into lumps or a hard mass on storage and to methods of lowering the tendency towards caking or setting of sodium nitrate. The invention is also concerned with solid sodium nitrate products in multi-particulate form which include said sodium nitrate having a greatly reduced tendency towards caking and setting.

Sodium nitrate is a hygroscopic salt more soluble in hot water than in cold and crystals of solid sodium nitrate have an objectionable tendency to cake and set into lumps or into a continuous mass on storage. This is believed to be due to the formation of crystalline bridges from a saturated solution which is formed between adjacent particles of sodium nitrate either due to incomplete drying or absorption of moisture from the atmosphere and which crystallises when changes occur in atmospheric conditions. This tendency of sodium nitrate to cake or set is not only an extreme inconvenience in the handling of the salt in bulk or in bags but may also interfere with some of its applications.

It is well known that the setting and caking tendency of ammonium nitrate and potassium nitrate can be reduced by the application of certain sulphonated organic dyestuffs which modify the crystal habit of these salts but J. Whetstone in "Discussions of the Faraday Society" No. 5, 1949 "Crystal Growth" p. 265 states that no dyestuff has yet been found capable of giving a marked reduction in the setting tendency of sodium nitrate and that no dye has been observed to modify the crystal habit of sodium nitrate to any substantial degree. H. E. Buckley in "Crystal Growth" p. 556 gives examples of dyestuffs which effect some modification on the crystal habit of sodium nitrate but these dyestuffs do not prevent the caking and setting of sodium nitrate.

The object of the invention is to provide sodium nitrate particles of reduced caking and setting properties.

Among the dyestuffs found effective for reducing the setting and caking tendency of ammonium nitrate and potassium nitrate it was noted that a large number of sulphonated mono-azonaphthalene dyestuffs were effective as crystal habit modifiers and although these dyestuffs are not effective as crystal habit modifiers for sodium nitrate it was nevertheless considered that a compound of similar chemical configuration wherein the double bond of the azo group is replaced by a more flexible linkage may be so effective. It was thus considered that a colourless compound definable as a condensation product of 1 mol. of formaldehyde and 2 mols. of a naphthalene monosulphonic acid wherein the methylene group replaces the chromophoric azo group might have crystal habit modifying properties for sodium nitrate.

Sodium nitrate of reduced tendency to caking and setting on storage according to the invention consists of discrete sodium nitrate particles carrying on their surfaces a deposit comprising a salt soluble in a saturated aqueous sodium nitrate solution at 20° C. of at least one compound definable as a condensation product of 1 mol. of formaldehyde and 2 mols. of a naphthalene mono-sulphonic acid.

According to the present invention the method for the production of sodium nitrate of reduced tendency to caking and setting on storage comprises effecting crystallisation of an aqueous solution of sodium nitrate containing, reckoned on the weight of the dry sodium nitrate particles, 0.025% of a salt soluble in a saturated aqueous sodium nitrate solution at 20° C. of at least one compound definable as a condensation product of 1 mol. of formaldehyde and 2 mols. of a naphthalene mono-sulphonic acid.

Alternatively, according to the invention the method for the production of sodium nitrate of reduced tendency to caking and setting on storage comprises spraying an aqueous solution of a salt soluble in a saturated sodium nitrate solution at 20° C. of at least one compound definable as a condensation product of 1 mol. of formaldehyde and 2 mols. of a naphthalene mono-sulphonic acid over the surfaces of previously formed sodium nitrate particles.

It is assumed that in said compound which is a di-sulphonic acid of a dinaphthylmethane the sulphonic acid groups are in the rings to which the methylene group is not attached and are in one of the $\alpha$ positions in one naphthyl group and in one of the $\alpha$ positions in the other naphthyl group or in one of the $\beta$ positions in one naphthyl group and in one of the $\beta$ positions in the other naphthyl group or in one of the $\alpha$ positions in one naphthyl group and in one of the $\beta$ positions in the other naphthyl group depending upon whether naphthalene-$\alpha$-sulphonic acid, naphthalene-$\beta$-sulphonic acid, or an equimolecular mixture of these is reacted with formaldehyde or its equivalent, preferably in the presence of sulphuric acid or hydrochloric acid as for example in accordance with the method described in Canadian specification No. 347,865 or U. S. specification No. 2,046,757.

Since as indicated in said Canadian and U. S. specifications the precise position of the methylene group in the resulting disulphonic acids has not yet been ascertained with certainty it is not strictly correct to define a di-sulphonic acid of a dinaphthylmethane used in the form of a soluble salt to carry out the invention by referring to the $\alpha:\alpha'$, $\beta:\beta'$ or $\alpha:\beta'$ positions for the purpose of locating the sulphonic acid groups in the two naphthyl groups. Nevertheless, for convenience hereinafter the disulphonic acids of dinaphthylmethane will be referred to as $\alpha:\alpha'$, $\beta:\beta'$ or $\alpha:\beta'$-disulphonic acids of dinaphthylmethane according to whether the compound is derived respectively by reacting with formaldehyde or its equivalent naphthalene-$\alpha$-sulphonic acid, naphthalene-$\beta$-sulphonic acid, or an equimolecular mixture of these two naphthalene sulphonic acids.

Sodium nitrate belongs to the trigonal crystal system. It is normally obtained on crystallisation from water in the form of rhombohedra in which the {1011} faces are the predominating faces.

When crystallised from a solution of a soluble salt of any of the aforesaid disulphonic acids of a dinaphthylmethane, however, the crystals of sodium nitrate obtained are thin plates in which the {0001} faces predominate. These plates have cleavage planes at angles to the {0001} faces, namely a perfect rhombohedral cleavage. These modified crystals are of reduced mechanical strength because of the angular disposition of these cleavage planes and thus it is assumed that the strength of the bridges of recrystallised material which form between adjacent particles of sodium nitrate in the presence of said salts is reduced. Even if already existing crystals of normal habit are surface treated with the aforesaid soluble salts, however, any crystal bridges formed by recrystallisation between adjacent particles of the so treated sodium nitrate as a result of atmospheric variations will be of correspondingly reduced strength as compared with those formed in the case of untreated sodium nitrate. Quantities of the aforesaid salts of dinaphthylmethane disulphonic acids from at least approximately 0.025% reckoned on the weight of the dry sodium nitrate particles are effective in varying degree, and it is preferred to employ quantities from 0.05 to 0.1% by weight.

The invention may be put into effect by dissolving a soluble salt of the aforesaid dinaphthylmethane disulphonic acid in the aqueous solution from which the sodium nitrate is obtained in solid form, for example by graining or direct crystallisation of the sodium nitrate. When the sodium nitrate crystallises out the interior of the solid crystal particles is substantially free from the soluble salt of the dinaphthylmethane disulphonic acid, and it is evaporation of the adhering mother liquor which deposits the thin coating of the said soluble salt on the crystals.

Another and preferred method of applying the aforesaid salt of the dinaphthylmethane disulphonic acid is to dissolve the latter in water and spray or otherwise distribute the resulting solution over the surfaces of previously formed sodium nitrate crystals, and bring about evaporation of the volatile solvent while keeping the particles in motion.

The invention is illustrated in the following examples in which the percentages are percentages by weight.

*Example 1*

The sodium salt of $\beta:\beta'$-disulphonic acid of dinaphthylmethane is prepared by heating under gentle reflux for 24 hours a mixture of 8.3 parts by weight of $\beta$-naphthalenesulphonic acid, 1.9 parts by weight of an aqueous solution of formaldehyde (37% w./v.) and 1.9 parts by weight of sulphuric acid (S. G. 1.84) in 10 parts by weight of water and neutralising the resulting liquor with a sodium hydroxide solution.

Sodium nitrate of particle size passing a 36 British Standard Specification mesh screen is treated with 0.05% of the sodium salt of $\beta\beta'$-disulphodinaphthylmethane sprayed on as a 10% aqueous solution. The product is mixed in an incorporator and the excess water driven off, so that the sodium nitrate particles acquire a surface coating of the said sodium salt. The dry product preserves the original form and white colour of the granules, and is markedly resistant to setting even after storage in unsealed cardboard containers for several months.

*Example 2*

Sodium nitrate is crystallised from aqueous solution with vigorous stirring in the presence of 0.1% of the sodium salt of $\beta\beta'$-disulphodinaphthylmethane. The resulting sodium nitrate is in small plate-like crystals. These crystals are separated from their mother liquor and dried. They are free running and markedly resistant to setting and are perfectly white in appearance.

*Example 3*

The sodium salt of $\alpha:\alpha'$-disulphonic acid of dinaphthylmethane is prepared by heating under gentle reflux for 24 hours a mixture of 8.5 parts by weight of $\alpha$-naphthalenesulphonic acid, 2.0 parts by weight of an aqueous solution of formaldehyde (37% w./v.) and 2.7 parts by weight of sulphuric acid (S. G. 1.84) in 10 parts by weight of water and neutralising the resulting liquor with a sodium hydroxide solution.

The procedure is the same as for Example 1 except that the sodium salt of $\alpha\alpha'$-disulphodinaphthylmethane is used instead of the $\beta\beta'$ isomer. The resultant product preserves its white colour and is free running and strongly resistant to setting, though the effect is not so marked as in Example 1. These characteristics remain after several months storage in loosely-stoppered bottles.

*Example 4*

The sodium salt of $\alpha:\beta'$-disulphonic acid of dinaphthylmethane is prepared by heating under gentle reflux for 24 hours a mixture of 20.8 parts by weight of $\alpha$-naphthalenesulphonic acid, 20.8 parts by weight of $\beta$-naphthalenesulphonic acid, 11.0 parts by weight of aqueous formaldehyde solution (37% w./v.) and 12.5 parts by weight of sulphuric acid (S. G. 1.84) in 44 parts by weight of water and neutralising the resulting liquor with a sodium hydroxide solution.

The procedure is the same as for Example 2, except that the sodium salt of $\alpha\beta'$-disulphodinaphthylmethane is used instead of the $\beta\beta'$ isomer. The resulting small plate-like crystals are white in colour, free running and strongly resistant to setting after storage for several months.

What I claim is:

1. Sodium nitrate of reduced tendency to caking and setting on storage comprising discrete sodium nitrate particles carrying on their surfaces a deposit of at least one salt of an acid selected from the group consisting of the $\alpha:\alpha'$, $\beta:\beta'$ and $\alpha:\beta'$ disulphonic acids of dinaphthylmethanes said salt being soluble in a saturated aqueous sodium nitrate solution at 20° C.

2. Sodium nitrate according to claim 1 wherein the $\alpha:\alpha'$ disulphonic acid is the condensation product of formaldehyde and naphthalene-$\alpha$-sulphonic acid.

3. Sodium nitrate according to claim 1 wherein the $\beta:\beta'$ disulphonic acid is the condensation product of formaldehyde and naphthalene-$\beta$-sulphonic acid.

4. Sodium nitrate according to claim 1 wherein the $\alpha:\beta$ disulphonic acid is the condensation product of formaldehyde and an equimolecular mixture of naphthalene-$\alpha$-sulphonic acid and naphthalene-$\beta$-sulphonic acid.

5. Sodium nitrate as claimed in claim 1 wherein the quantity of the soluble salt of the aforesaid disulphonic acids of dinaphthylmethane is at least approximately 0.025% reckoned on the weight of the dry sodium nitrate particles.

6. Sodium nitrate as claimed in claim 5 wherein the quantity of the said soluble salt is from 0.05 to 0.1%.

7. A method for the production of sodium nitrate of reduced tendency to caking and setting on storage which comprises effecting crystallisation of an aqueous solution of sodium nitrate containing, reckoned on the weight of the dry sodium nitrate particles, from 0.025% of at least one salt of an acid selected from the group consisting of the $\alpha:\alpha'$, $\beta:\beta'$ and $\alpha:\beta'$ disulphonic acids of dinaphthylmethanes, said salt being soluble in a saturated aqueous sodium nitrate solution at 20° C.

8. A method as claimed in claim 7 which comprises effecting the direct crystallisation of the aqueous solution of sodium nitrate containing the said salt.

9. A method as claimed in claim 7 which comprises effecting the granulation of an aqueous solution of sodium nitrate containing the said salt.

10. A method for the production of sodium nitrate of reduced tendency to caking and setting on storage which comprises spraying an aqueous solution of at least one salt of an acid selected from the group consisting of the $\alpha:\alpha'$, $\beta:\beta'$ and $\alpha:\beta'$ disulphonic acids of dinaphthylmethanes, said salt being soluble in a saturated aqueous sodium nitrate solution at 20° C. over the surfaces of previously formed sodium nitrate particles.

References Cited in the file of this patent

UNITED STATES PATENTS 2,616,785     Butchart _____ Nov. 4, 1952

FOREIGN PATENTS 656,048     Great Britain _____ Dec. 29, 1948